US012498647B2

(12) United States Patent
Kogiso

(10) Patent No.: US 12,498,647 B2
(45) Date of Patent: Dec. 16, 2025

(54) IMAGE FORMING APPARATUS WITH OZONE REMOVAL

(71) Applicant: TOSHIBA TEC KABUSHIKI KAISHA, Tokyo (JP)

(72) Inventor: Yoshiki Kogiso, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 840 days.

(21) Appl. No.: 17/836,012

(22) Filed: Jun. 9, 2022

(65) Prior Publication Data

US 2022/0380220 A1 Dec. 1, 2022

Related U.S. Application Data

(63) Continuation of application No. 17/366,211, filed on Jul. 2, 2021, now Pat. No. 11,385,560.

(51) Int. Cl.
*G03G 15/02* (2006.01)
*G03G 21/20* (2006.01)

(52) U.S. Cl.
CPC ....... *G03G 15/0258* (2013.01); *G03G 21/206* (2013.01); *G03G 2221/1645* (2013.01)

(58) Field of Classification Search
CPC ............. G03G 15/0258; G03G 21/206; G03G 2221/1645
USPC ...................................................... 399/92, 93
See application file for complete search history.

(56) References Cited

U.S. PATENT DOCUMENTS 5,655,187 A 8/1997 Watanabe et al.
8,554,104 B2 * 10/2013 Shimoyama ......... G03G 21/206 399/92
2001/0010767 A1 8/2001 Watanabe
2019/0107807 A1 4/2019 Kamano et al.
2020/0201208 A1 6/2020 Kouzu

FOREIGN PATENT DOCUMENTS

JP 02-293767 12/1990
JP 08101626 A * 4/1994
JP 08-101626 4/1996
JP 09-120239 5/1997
JP 2003-066675 3/2003
JP 2019-155785 9/2019

OTHER PUBLICATIONS

Non-Final Office Action for U.S. Appl. No. 17/366,211 dated Dec. 22, 2021.

* cited by examiner

*Primary Examiner* — Robert B Beatty

(74) *Attorney, Agent, or Firm* — Amin, Turocy & Watson, LLP

(57) ABSTRACT

An image forming apparatus includes a photoconductor, a charger, a ventilation mechanism, an exposure device, a developing device, a transfer device, and a controller. The ventilation mechanism guides ozone generated in the charger to an ozone discharge port. The exposure device forms an electrostatic latent image on the photoconductor charged by the charger. The transfer device transfers a toner image on the photoconductor developed by the developer supplied from the developing device to a medium. The controller allows the ventilation mechanism to discharge the ozone generated in the charger from the ozone discharge port after stopping supply of the developer from the developing device to the photoconductor in an operation mode in which the ozone is discharged.

16 Claims, 7 Drawing Sheets

IMAGE FORMING APPARATUS WITH OZONE REMOVAL

CROSS-REFERENCE TO RELATED APPLICATION

This application is a Continuation of application Ser. No. 17/336,211 filed on Jul. 2, 2021, the entire contents of which are incorporated herein by reference.

FIELD

Embodiments described herein relate generally to image forming apparatuses and methods of processing ozone.

BACKGROUND

In the related art, an electrophotographic image forming apparatus includes a charger that charges a photoconductor drum. Some chargers charge the photoconductor drums by a scorotron method or a corotron method. The scorotron type or corotron type charger generates ozone when charging the photoconductor drum. In an image forming apparatus in the related art, a gas containing the ozone generated in the charger is discharged to the outside through a filter that adsorbs the ozone. On the other hand, the ozone is known to have a sterilizing effect. The image forming apparatus in the related art has a problem that, since the ozone is removed with the filter, the ozone having the sterilizing effect is not effectively utilized.

DETAILED DESCRIPTION

In general, according to one embodiment, an image forming apparatus includes a photoconductor, a charger, a ventilation mechanism, an exposure device, a developing device, a transfer device, and a controller. The charger charges the photoconductor. The ventilation mechanism guides ozone generated in the charger to an ozone discharge port. The exposure device forms an electrostatic latent image on the photoconductor charged by the charger. The developing device supplies a developer for developing the electrostatic latent image on the photoconductor. The transfer device transfers a toner image on the photoconductor developed by the developer supplied from the developing device to a medium. In an operation mode in which the ozone is discharged, the controller allows the ventilation mechanism to discharge the ozone generated in the charger from the ozone discharge port after stopping supply of the developer from the developing device to the photoconductor. According to another embodiment, an method of processing ozone in an image forming apparatus involves charging a photoconductor thereby generating ozone; guiding ozone generated to an ozone discharge port through a ventilation mechanism; forming an electrostatic latent image on the photoconductor charged; supplying a developer comprising toner for developing the electrostatic latent image on the photoconductor; transferring a toner image from the photoconductor to a medium; and allowing the ventilation mechanism to discharge the ozone generated from the ozone discharge port after stopping supply of the developer to the photoconductor in an operation mode.

Hereinafter, an image forming apparatus of an embodiment will be described with reference to the drawings.

Figure 1:
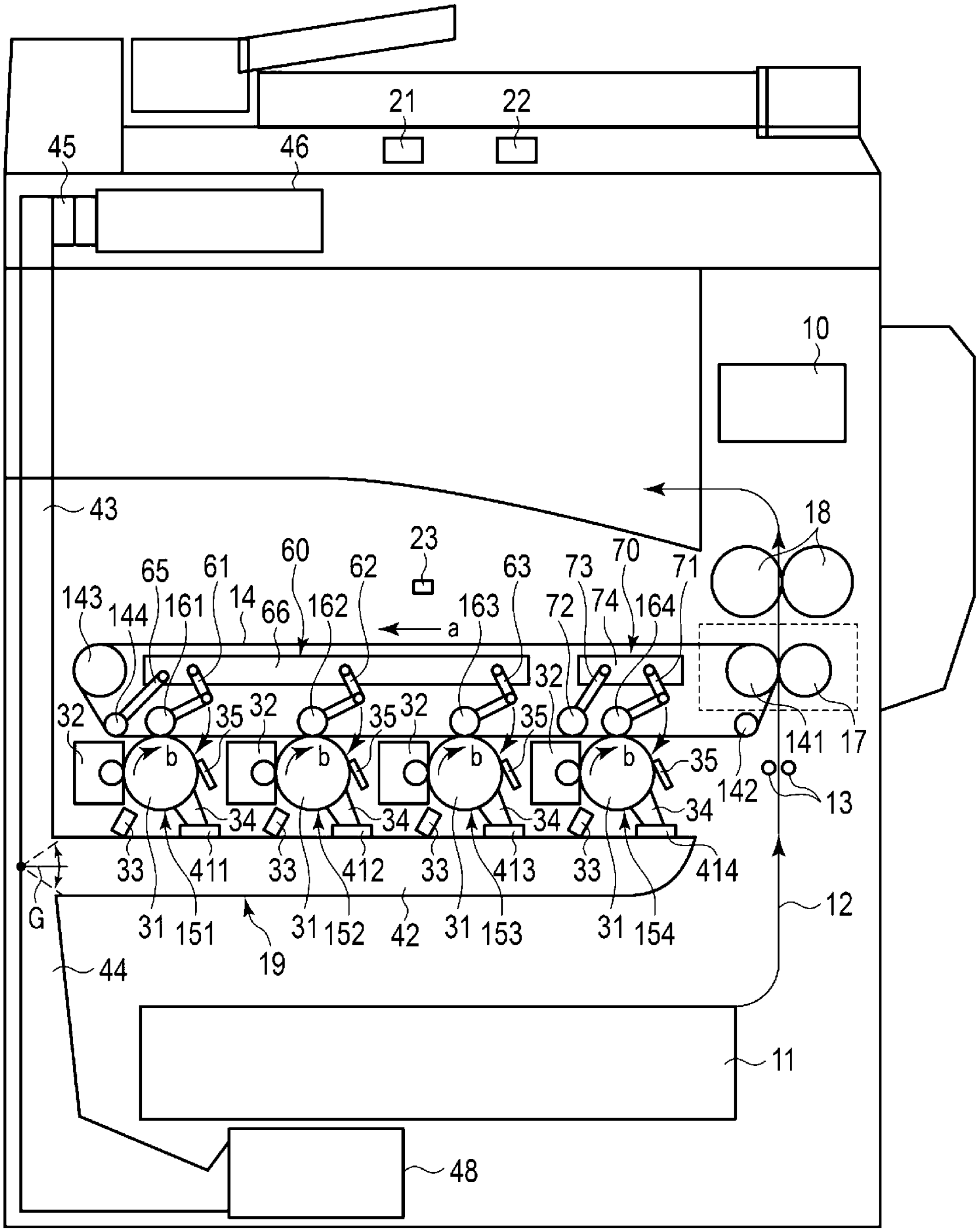
FIG. 1 is a diagram illustrating a configuration example of an image forming apparatus according to an embodiment.

FIG. 1 is a diagram illustrating a configuration example of an image forming apparatus 1 according to the embodiment.

As illustrated in FIG. 1, the image forming apparatus 1 is an electrophotographic image forming apparatus. The image forming apparatus 1 includes a controller 10, a paper feeding mechanism 11, a conveying mechanism 12, a registration roller 13, an intermediate transfer belt (intermediate transfer body) 14, an image forming station 15 (151 to 154), a primary transfer roller (transfer device) 16 (161 to 164), a secondary transfer roller 17, a fixing device 18, a ventilation mechanism 19, a motion sensor 21, an optical sensor 22, a temperature humidity sensor 23, and the like.

The controller 10 controls operations of each component in the image forming apparatus 1. The controller 10 includes a processor, various memories, and various interfaces. The controller 10 executes various processes by allowing the processor to execute a program.

The paper feeding mechanism 11 supplies sheets. The paper feeding mechanism 11 has a cassette for storing a plurality of the sheets. The paper feeding mechanism 11 supplies the sheets stored in the cassette to the conveying mechanism 12 one by one. The conveying mechanism 12 conveys the sheet. The conveying mechanism 12 conveys the sheet supplied from the paper feeding mechanism 11 to a discharge port.

The registration roller 13 stops the sheet conveyed by the conveying mechanism 12. The registration roller 13 is provided at a front position (secondary transfer position) of the image transferred to the sheet. The secondary transfer position is a position facing the secondary transfer roller 17 and a sheet conveyance path via the intermediate transfer belt 14. The registration roller 13 supplies the paper to the secondary transfer position at a timing when the image on the intermediate transfer belt 14 moves to the secondary transfer position.

The intermediate transfer belt 14 is a medium to which toner images formed by image forming stations 151 to 154 are transferred. The intermediate transfer belt 14 is an endless belt supported by a plurality of rollers. The intermediate transfer belt 14 is provided at a position corresponding to an arrangement of photoconductor drums 31 of the image forming stations 151 to 154. In the configuration example illustrated in FIG. 1, the photoconductor drums 31 of the image forming stations 151 to 154 are arranged side by side in a horizontal direction. The intermediate transfer belt 14 is arranged above each of the photoconductor drums 31 arranged in the horizontal direction.

The intermediate transfer belt 14 is stretched on a driving roller 141, a driven roller 142, a tension roller 143, and a position switching roller 144. The driving roller 141 and the tension roller 143 are provided at positions separated from each other in the horizontal direction. The driven roller 142 is provided below the driving roller 141. The position switching roller 144 is provided below the tension roller 143.

The driving roller 141 drives the intermediate transfer belt 14 in a direction of an arrow a. The driven roller 142 supports the intermediate transfer belt 14 at a predetermined position. The driven roller 142 is driven by the intermediate transfer belt 14 rotated by the driving roller 141. The tension roller 143 applies tension to the intermediate transfer belt 14 by an elastic force of an elastic body such as a spring. The tension roller 143 presses the intermediate transfer belt 14 outward.

The position of the position switching roller 144 is displaced according to an operation mode. In a color printing mode, the position switching roller 144 moves to a position (first position) for color printing. In a monochrome printing mode of printing an image in a single color of black, the position switching roller 144 moves to a position (second position) for monochrome printing. In addition, in an ozone discharge mode, the position switching roller 144 moves to a position (second position) for ozone discharge.

While moving in the direction of the arrow a, the intermediate transfer belt 14 transfers the toner images formed by the image forming stations 151 to 154. The intermediate transfer belt 14 retains the toner images transferred from the image forming stations 151 to 154. The intermediate transfer belt 14 carries the toner images transferred from the image forming stations 151 to 154 to the secondary transfer position where the secondary transfer roller 17 and the sheet to be conveyed in the conveyance path face each other.

The image forming stations 151 to 154 include the photoconductor drum (photoconductor) 31, a developing device 32, an exposure device 33, a charger 34, and a cleaner 35, respectively. The image forming stations 151 to 154 form an image with toner contained in the developing device 32. Hereinafter, the image forming station 151 is assumed to form a yellow image with toner of yellow contained in the developing device 32. The image forming station 152 is assumed to form an image of magenta with toner of magenta contained in the developing device 32. The image forming station 153 is assumed to form an image of cyan with toner of cyan contained in the developing device 32. The image forming station 154 is assumed to form an image of black with toner of black contained in the developing device 32.

An image is formed on an outer circumference surface of the photoconductor drum 31. The outer circumference surface of the photoconductor drum 31 is an image carrier. The outer circumference surface of the photoconductor drum 31 moves as the photoconductor drum rotates. The photoconductor drum 31 rotates in a forward direction or a reverse direction under the control of the controller 10. The photoconductor drum 31 rotates in the forward direction when forming the image on the outer circumference surface (when executing an image printing operation). In the configuration example illustrated in FIG. 1, the forward direction is a direction of an arrow b illustrated in FIG. 1. By rotating the photoconductor drum 31 in the forward direction, the outer circumference surface of the photoconductor drum 31 moves along the moving direction (direction of the arrow a) of the intermediate transfer belt 14.

The charger 34 charges the outer circumference surface of the photoconductor drum 31 so as to have a negative polarity. The charger 34 employs a charging method in which the ozone is generated using a wire or a needle such as a scorotron or a corotron. The on and off of the charger 34 are controlled by the controller 10. In the ozone discharge mode, the charger 34 becomes an ozone generator that generates the ozone under the control of the controller 10.

The ventilation mechanism 19 is a mechanism for discharging a gas containing the ozone generated in the charger 34 to an outside of a housing. The ventilation mechanism 19 illustrated in FIG. 1 is a first configuration example. The ventilation mechanism 19 includes fans 41, a duct 42, ventilation paths 43 and 44, a fan 45, a first gas-discharge port (ozone discharge port) 46, a shutter 47, a second gas-discharge port (filter discharge port) 48, a filter 49, and the like.

The fans 41 are provided corresponding to the chargers 34 of the image forming stations 151 to 154. Each of the fans 41 sends each gas containing the ozone generated in the chargers 34 of the corresponding image forming stations 151 to 154 to the duct 42. The gas sent to the duct 42 is discharged from the first gas-discharge port 46 or the second gas-discharge port 48 to the outside of the housing of the image forming apparatus 1 through the ventilation path 43 or the ventilation path 44. It is noted that the ventilation mechanism 19 will be described in detail later.

The exposure device 33 exposes the photoconductor drum 31 charged so as to have a negative polarity with a laser. The exposure device 33 exposes the outer circumference surfaces of the photoconductor drums 31 based on image information of the corresponding colors of the image forming stations 151 to 154. An electrostatic latent image is formed on the outer circumference surface of the photoconductor drum 31 exposed with the laser from the exposure device 33. The photoconductor drum 31 retains the electrostatic latent image formed by the exposure device 33. The photoconductor drum 31 rotates in the forward direction to move the electrostatic latent image formed on the outer circumference surface by the exposure device 33 to the developing position which the developing device 32 faces.

The developing device 32 develops the electrostatic latent image on the outer circumference surface of the photoconductor drum 31 with toner. The photoconductor drum 31 retains the toner image visualized by the toner supplied from the developing device 32. The developing device 32 contains a developer of the image formed by each of the image forming stations 151 to 154.

For example, the image forming station 151 forms an image of yellow, which is one of a plurality of colors constituting a color image. The developing device 32 of the image forming station 151 contains toner of yellow and carriers as a developer. The image forming station 151 develops the electrostatic latent image of the photoconductor drum 31 with the toner of yellow contained in the developing device 32. The image forming station 151 carries the toner image of yellow developed on the photoconductor drum 31 rotating in the forward direction to the primary transfer position where the photoconductor drum 31 and a primary transfer roller 161 face each other. The toner image of yellow on the photoconductor drum 31 of the image forming station 151 is transferred to the intermediate transfer belt 14 by the primary transfer roller 161 at the primary transfer position.

The image forming station 152 forms an image of magenta, which is one of the plurality of colors constituting the color image. The developing device 32 of the image forming station 152 contains the toner of magenta and carriers as a developer. The image forming station 152 develops the electrostatic latent image of the photoconductor drum 31 with the toner of magenta contained in the developing device 32. The image forming station 152 carries the toner image of magenta developed on the photoconductor drum 31 rotating in the forward direction to the primary transfer position where the photoconductor drum 31 and a primary transfer roller 162 face each other. The toner image of magenta on the photoconductor drum 31 of the image forming station 152 is transferred to the intermediate transfer belt 14 by the primary transfer roller 162 at the primary transfer position.

The image forming station 153 forms an image of cyan, which is one of the plurality of colors constituting the color image. The developing device 32 of the image forming station 153 contains the toner of cyan and carriers as a developer. The image forming station 153 develops the electrostatic latent image of the photoconductor drum 31 with the toner of cyan contained in the developing device 32. The image forming station 153 carries the toner image of cyan developed on the photoconductor drum 31 rotating in the forward direction to the primary transfer position where the photoconductor drum 31 and the primary transfer roller 163 face each other. The toner image of cyan on the photoconductor drum 31 of the image forming station 153 is transferred to the intermediate transfer belt 14 by the primary transfer roller 163 at the primary transfer position.

The image forming station 154 forms an image of black. The developing device 32 of the image forming station 154 contains the toner of black and carriers as a developer. The image forming station 154 develops the electrostatic latent image of the photoconductor drum 31 with the toner of black contained in the developing device 32. The image forming station 154 carries the toner image of black developed on the photoconductor drum 31 rotating in the forward direction to the primary transfer position where the photoconductor drum 31 and the primary transfer roller 164 face each other. The toner image of black on the photoconductor drum 31 of the image forming station 154 is transferred to the intermediate transfer belt 14 by the primary transfer roller 162 at the primary transfer position.

The cleaner 35 cleans the toner remaining on the photoconductor drum 31 without being transferred to the intermediate transfer belt 14. The cleaner 35 recovers the toner on the surface of the rotating photoconductor drum 31 with a cleaning blade. By rotating the photoconductor drum 31 in the forward direction, the outer circumference surface cleaned by the cleaner 35 moves to a charging position of the charger 34 again.

The primary transfer rollers 161 to 164 correspond to the image forming stations 151 to 154, respectively. Each of the primary transfer rollers 161 to 164 transfers the toner images on the photoconductor drums 31 of the corresponding image forming stations 151 to 154 to the intermediate transfer belt 14.

The primary transfer roller 161 faces the photoconductor drum 31 of the image forming station 151 with the intermediate transfer belt 14 interposed therebetween. The primary transfer roller 162 faces the photoconductor drum 31 of the image forming station 152 with the intermediate transfer belt 14 interposed therebetween. The primary transfer roller 163 faces the photoconductor drum 31 of the image forming station 153 with the intermediate transfer belt 14 interposed therebetween. The primary transfer roller 164 faces the photoconductor drum 31 of the image forming station 154 with the intermediate transfer belt 14 interposed therebetween.

When printing an image in color (in the color printing mode), the primary transfer rollers 161 to 164 overlappingly transfer the toner images formed by the image forming stations 151 to 154 to the intermediate transfer belt 14. The primary transfer roller 161 transfers the toner image of yellow formed by the image forming station 151 to the intermediate transfer belt 14. The primary transfer roller 162 overlappingly transfers the toner image of magenta formed by the image forming station 152 to the toner image of yellow on the intermediate transfer belt 14. The primary transfer roller 163 overlappingly transfers the toner image of cyan formed by the image forming station 153 to the toner images of yellow and magenta on the intermediate transfer belt 14. The primary transfer roller 164 overlappingly transfers the toner image of black formed by the image forming station 154 to the toner images of yellow, magenta, and cyan on the intermediate transfer belt 14.

When printing an image in a single color of black (in the monochrome printing mode), the primary transfer roller 164 transfers the toner image formed by the image forming station 154 to the intermediate transfer belt 14.

The image forming apparatus 1 includes a separation mechanism for separating the intermediate transfer belt 14 and the photoconductor drum 31 according to the operation mode. For example, in the monochrome printing mode, the controller 10 separates the intermediate transfer belt 14 from the photoconductor drums 31 of the image forming stations 151 to 153. When executing ozone discharge (in the ozone discharge mode), the controller 10 separates the intermediate transfer belt 14 from the photoconductor drums 31 of the image forming stations 151 to 154.

In the configuration example illustrated in FIG. 1, the image forming apparatus 1 includes a color separation mechanism 60 and a monochrome separation mechanism 70 as the separation mechanisms. The color separation mechanism 60 separates the intermediate transfer belt 14 from the photoconductor drums 31 of the image forming stations 151 to 153. The monochrome separation mechanism 70 separates the intermediate transfer belt 14 from the photoconductor drum 31 of the image forming station 154.

The color separation mechanism 60 includes an arm 61, an arm 62, an arm 63, an operation arm 65, and a slider 66.

The arms 61, 62, and 63 have an L-shape. For the arms 61, 62, and 63, one-side ends of the L-shapes are fixed to the primary transfer rollers 161, 162, and 163, and the other-side ends are fixed to the slider 66. The arms 61, 62, and 63 are fixed at respective predetermined positions with the L-shaped bent portions as axes. The arm 62 rotates about the axis of the bent portion.

One end of the operation arm 65 is engaged with the slider 66, and the other end can be allowed to press the position switching roller 144. The position switching roller 144 can switch between the first position and the second position. The position switching roller 144 is at the first position in a state of being pressed by the operation arm 65. The position switching roller 144 at the first position is pushed by the operation arm 65 and presses the intermediate transfer belt 14 against each photoconductor drum 31. The position switching roller 144 is at the second position in a state where the pressing from the operation arm 65 is released. The position switching roller 144 is displaced to the second position by the tension of the intermediate transfer belt 14 when the pressing from the operation arm 65 is released.

The slider 66 includes a moving mechanism that moves under the control of the controller 10. The slider 66 moves to the left from the position illustrated in FIG. 1 by the moving mechanism. In addition, the slider 66 can also move to the left and, after that, return to the position illustrated in FIG. 1.

The arms 61 to 63 and the operation arm 65 cooperate with the movement of the slider 66. When the slider 66 moves to the left from the position illustrated in FIG. 1, the arms 61, 62, and 63 rotate clockwise about the axis of the bent portion. If the arms 61, 62, and 63 rotate clockwise, the primary transfer rollers 161, 162, and 163 are displaced in a direction to be separated from the photoconductor drum 31.

The operation arm 65 presses the position switching roller 144 in a state where the slider 66 is in the position illustrated in FIG. 1. The position switching roller 144 pushed by the operation arm 65 is at the first position for pressing the intermediate transfer belt 14.

If the slider 66 moves to the left from the position illustrated in FIG. 1, the end portion of the operation arm 65 is disengaged from the position where the position switching roller 144 is pressed. If the end portion of the operation arm 65 is disengaged from the position switching roller 144, the pressing from the operation arm 65 is released. If the pressing from the operation arm 65 is released, the position switching roller 144 is displaced in the direction approaching the slider 66 by the tension of the intermediate transfer belt 14. That is, if the slider 66 moves to the left from the position illustrated in FIG. 1, the position switching roller 144 is displaced from the first position to the second position.

If the slider 66 moves to the left, the primary transfer rollers 161, 162, and 163 are separated from the photoconductor drums 31, and the position switching roller 144 is displaced to the second position. The intermediate transfer belt 14 is separated from the photoconductor drums 31 of the image forming stations 151 to 153 by the displacement of the primary transfer rollers 161, 162, and 163 and the position switching roller 144. The controller 10 executes the monochrome printing in a state where the intermediate transfer belt 14 is separated from the photoconductor drums 31 of the image forming stations 151 to 153.

The monochrome separation mechanism 70 includes an arm 71, an operation arm 72, a position switching roller 73, and a slider 74.

The arm 71 has an L-shape. For the arm 71, one-side end of the L-shape is fixed to the primary transfer roller 164, and the other-side end is fixed to the slider 74. The arm 71 is fixed at a predetermined position with the L-shaped bent portion as an axis. The arm 71 rotates about the axis of the bent portion.

One end of the operation arm 72 is engaged with the slider 74, and the other end can be allowed to press the position switching roller 73. The position switching roller 73 can switch between the first position and the second position. The position switching roller 73 is at the first position in a state of being pressed by the operation arm 72. The position switching roller 73 at the first position is pushed by the operation arm 72 to press the intermediate transfer belt 14 against the photoconductor drum 31. The position switching roller 73 allows the intermediate transfer belt 14 to abut with the photoconductor drum 31 of the image forming station 154 at the first position in which the position switching roller 73 is pressed by the operation arm 72. For example, the position switching roller 73 allows the intermediate transfer belt 14 to abut with the photoconductor drum 31 for black even in a state where the photoconductor drum 31 for color and the intermediate transfer belt 14 are separated from each other.

The position switching roller 73 is at the second position in a state where the pressing from the operation arm 72 is released. The position switching roller 73 is displaced to the second position by the tension of the intermediate transfer belt 14 if the pressing from the operation arm 72 is released. The position switching roller 73 separates the intermediate transfer belt 14 and the photoconductor drum 31 of the image forming station 154 at the second position.

The slider 74 includes a moving mechanism that moves under the control of the controller 10. The slider 74 moves to the left from the position illustrated in FIG. 1 by the moving mechanism. In addition, the slider 74 can also move to the left and, after that, return to the position illustrated in FIG. 1.

The arm 71 and the operation arm 72 cooperate with the movement of the slider 74. If the slider 74 moves to the left from the position illustrated in FIG. 1, the arm 71 rotates clockwise about the axis of the bent portion. The primary transfer roller 164 is displaced in a direction in which the arm 71 rotates clockwise to be separated from the photoconductor drum 31.

If the slider 74 moves to the left from the position illustrated in FIG. 1, the end portion of the operation arm 72 that presses the position switching roller 73 is disengaged from the position switching roller 73. The position switching roller 73 from which the operation arm 72 is disengaged is displaced in the direction approaching the slider 74 by the tension of the intermediate transfer belt 14. If the slider 74 moves to the left from the position illustrated in FIG. 1, the position switching roller 73 is displaced from the first position to the second position.

If the slider 74 moves to the left, the primary transfer roller 164 and the position switching roller 73 are displaced in the direction to be separated from the photoconductor drum 31. The intermediate transfer belt 14 is separated from the photoconductor drum 31 of the image forming station 154 by the displacement of the primary transfer rollers 164 and the position switching rollers 73 as the slider 74 moves to the left. The controller 10 executes the ozone discharge mode described later in a state where the intermediate transfer belt 14 and each photoconductor drum 31 are separated by the color separation mechanism 60 and the monochrome separation mechanism 70.

It is noted that the controller 10 may discharge the ozone by separating the intermediate transfer belt 14 and the photoconductor drums 31 of the image forming stations 151 to 153 by the color separation mechanism 60. For example, the controller 10 separates the intermediate transfer belt 14 from the photoconductor drums 31 of the image forming stations 151 to 153 by the color separation mechanism 60. The controller 10 may allow the ozone generated by the chargers 34 of the image forming stations 151 to 153 in which the photoconductor drum 31 is separated from the intermediate transfer belt 14 to be discharged.

The secondary transfer roller 17 transfers the toner image formed on the intermediate transfer belt 14 to the sheet. The secondary transfer roller 17 faces the sheet supplied from the registration roller 13 with the intermediate transfer belt 14 interposed therebetween at the secondary transfer position. The registration roller 13 supplies the sheet to the secondary transfer position at the timing when the toner image on the intermediate transfer belt 14 moves to the secondary transfer position. The secondary transfer roller 17 transfers the toner image on the intermediate transfer belt 14 to the sheet at the secondary transfer position.

The fixing device 18 fixes the toner image transferred from the intermediate transfer belt 14 to the sheet by the secondary transfer roller to the sheet. The fixing device 18 heats and pressurizes the sheet to which the toner image is transferred. The toner on the sheet is fixed to the sheet by the heat and pressure applied to the sheet from the fixing device 18. The fixing device 18 discharges the fixing-processed sheets from the discharge port.

The motion sensor 21 senses a person. The motion sensor 21 uses a periphery of the image forming apparatus 1 as a detection range. The motion sensor 21 may be any sensor that detects a person being present in the periphery of the image forming apparatus 1 and is not limited to a sensor of a specific detection method. The motion sensor 21 supplies a detection signal indicating the presence or absence of a person to the controller 10. The controller 10 determines whether or not a person is present in the periphery of the image forming apparatus 1 based on the detection signal from the motion sensor 21.

The optical sensor 22 detects brightness. The optical sensor 22 uses the periphery of the image forming apparatus 1 as a detection range. The optical sensor 22 detects the brightness and supplies a detection signal indicating the brightness to the controller 10. The controller 10 specifies the brightness of the periphery of the image forming apparatus 1 based on the detection signal indicating the brightness detected by the optical sensor 22.

The temperature humidity sensor 23 detects temperature and humidity. The temperature humidity sensor 23 detects the temperature and the humidity inside the housing of the image forming apparatus 1. The temperature humidity sensor 23 supplies a detection signal indicating the temperature and the humidity to the controller 10. The controller 10 specifies the temperature and the humidity in the housing of the image forming apparatus 1 based on the detection signal indicating the temperature and the humidity detected by the temperature humidity sensor 23.

Next, the configuration of the ventilation mechanism for discharging the gas containing the ozone generated in the charger 34 to the outside of the housing in the image forming apparatus 1 according to the embodiment will be described.

Figure 2:
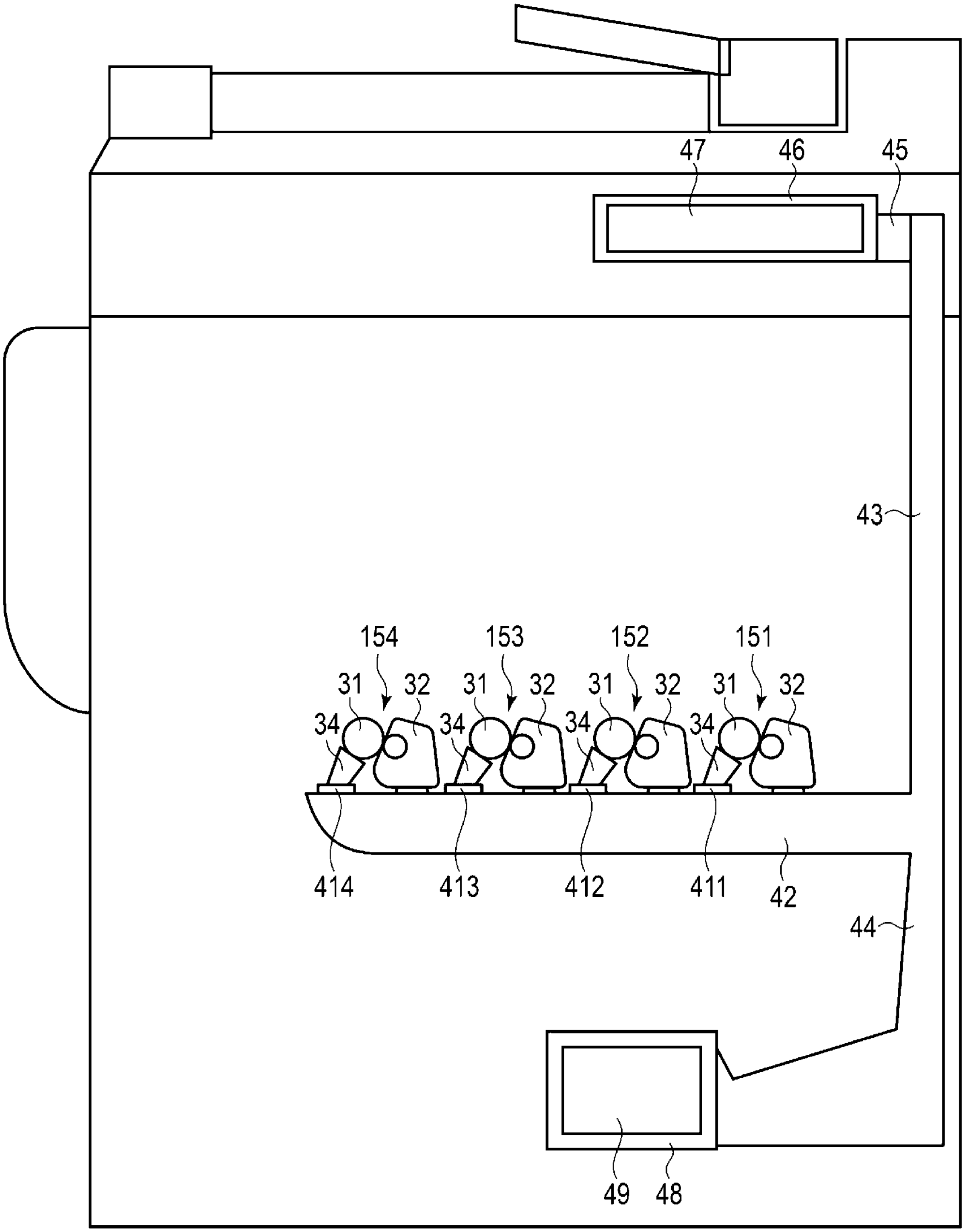
FIG. 2 is a diagram illustrating a ventilation mechanism of a first configuration example.

FIG. 2 is a diagram illustrating the ventilation mechanism 19 of the first configuration example in the image forming apparatus 1 according to the embodiment.

It is noted that FIG. 1 is a diagram schematically illustrating a configuration example in which the inside of the image forming apparatus 1 including the ventilation mechanism 19 of the first configuration example is viewed from the front side. FIG. 2 is a diagram schematically illustrating the configuration example in which the inside of the image forming apparatus 1 having the configuration illustrated in FIG. 1 is viewed from the side (back side) opposite to that of FIG. 1.

As illustrated in FIGS. 1 and 2, the ventilation mechanism 19 includes fans 41, a duct 42, a first ventilation path 43, a second ventilation path 44, a fan 45, a first gas-discharge port 46, a shutter 47, and a second gas-discharge port 48, and a filter 49.

The fans 41 (411, 412, 413, and 414) are provided corresponding to the chargers 34 of the image forming stations 151 to 154, respectively. The fan 411 sends a gas containing the ozone generated in the charger 34 of the image forming station 151 to the duct 42. The fan 412 sends a gas containing the ozone generated in the charger 34 of the image forming station 152 to the duct 42. The fan 413 sends a gas containing the ozone generated in the charger 34 of the image forming station 153 to the duct 42. The fan 414 sends a gas containing the ozone generated in the charger 34 of the image forming station 154 to the duct 42.

The duct 42 takes the gases containing the ozone generated in the chargers 34 of the image forming stations 151 to 154 via the fans 411 to 414. The duct 42 is branched into the first ventilation path 43 and the second ventilation path 44.

The first ventilation path 43 includes a ventilation path extending upward from a branch portion with the second ventilation path 44. The first gas-discharge port 46 is connected to the tip of the ventilation path extending upward from the first ventilation path 43. The first gas-discharge port 46 is a discharge port for discharging the gas passing through the first ventilation path 43 to the outside of the housing of the image forming apparatus 1. The first gas-discharge port 46 is an ozone discharge port that discharges the gas containing the ozone if the ozone is generated in the charger 34. The ventilation mechanism 19 can widely diffuse the ozone, which has a heavier specific gravity than air, by discharging the gas containing the ozone generated by the charger 34 from the first gas-discharge port 46 provided above the image forming apparatus 1. The ozone is known to have a virus sterilizing effect. By diffusing the ozone from the first gas-discharge port 46, it is possible to sterilize the periphery of the image forming apparatus 1.

The fan 45 is provided in front of the first gas-discharge port 46 from the first ventilation path 43. The fan 45 sends the gas in the first ventilation path 43 to the first gas-discharge port 46. The fan 45 may be arranged in the ventilation path 43 or may be installed in the first gas-discharge port 46. The fan 45 can allow the gas containing the ozone taken from the charger 34 to be likely to be discharged from the first gas-discharge port 46 provided above. In addition, as the air volume of the fan 45 is increased, the ozone discharged from the first gas-discharge port 46 is likely to be diffused outside the housing of the image forming apparatus 1.

The shutter 47 is provided to the first gas-discharge port 46. The shutter 47 opens or closes the first gas-discharge port 46.

If the shutter 47 is opened, the first gas-discharge port 46 can discharge the gas passing through the first ventilation path 43 to the outside of the housing of the image forming apparatus 1. If the ozone discharge condition is satisfied, the controller 10 allows the gas containing the ozone to be discharged from the first gas-discharge port 46 by opening the shutter 47.

If the shutter 47 is closed, the first gas-discharge port cannot discharge the gas passing through the first ventilation path 43 to the outside of the housing of the image forming apparatus 1. If the shutter 47 is closed, the first gas-discharge port 46 is shut off, so that the gas taken from the charger 34 is discharged from the second gas-discharge port 48. If the ozone discharge condition is not satisfied, the controller 10 allows the gas containing the ozone to be discharged from the second gas-discharge port 48 without discharging the gas containing the ozone from the first gas-discharge port 46 by closing the shutter 47.

The shutter 47 also operates as a louver that changes the direction of the flow of the gas discharged from the first gas-discharge port 46.

Figure 3:
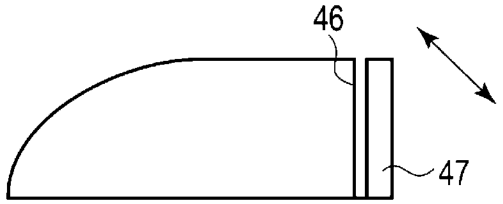
FIG. 3 is a diagram illustrating a state where the ventilation mechanism closes a shutter.
Figure 4:
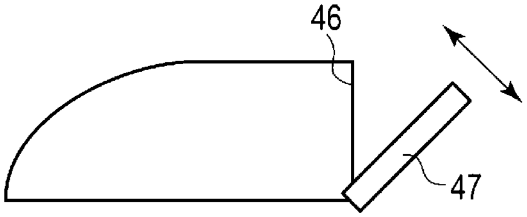
FIG. 4 is a diagram illustrating a state where the ventilation mechanism opens the shutter.

FIG. 3 illustrates a state where the shutter 47 in the ventilation mechanism 19 of the first configuration example is closed. FIG. 4 illustrates a state where the shutter 47 in the ventilation mechanism 19 of the first configuration example is opened.

As illustrated in FIG. 3, if the shutter 47 is closed, the first gas-discharge port 46 does not discharge the gas in the first ventilation path 43. If the shutter 47 is opened, the gas discharged from the first gas-discharge port 46 flows along the direction of the shutter 47. As illustrated in FIG. 4, if the upper portion of the shutter 47 is opened in a state where the lower portion of the shutter 47 is aligned with the first gas-discharge port 46, the gas discharged from the first gas-discharge port 46 is discharged upward. The shutter 47 allows the gas discharged from the first gas-discharge port 46 to be likely to be diffused outside the housing of the image forming apparatus 1 by discharging the gas discharged from the first gas-discharge port 46 upward.

It is noted that the shutter 47 may change the direction not only into the vertical direction but also into the horizontal direction. By changing the direction not only into the vertical direction but also into the horizontal direction, the shutter 46 can diffuse the flow of gas discharged from the first gas-discharge port 46 not only in the vertical direction but also in the horizontal direction.

The second ventilation path 44 includes a ventilation path extending downward from the branch portion with the first ventilation path 43. The second gas-discharge port 48 is provided in a lower portion of the image forming apparatus 1. The second gas-discharge port 48 is connected to the tip of the ventilation path extending downward from the second ventilation path 44. The second gas-discharge port 48 is a discharge port for discharging the gas passing through the second ventilation path 44 to the outside of the housing of the image forming apparatus 1. The filter 49 that adsorbs the ozone is provided to the second gas-discharge port 48. The filter 49 removes the ozone from the gas sent from the second ventilation path 44 to the second gas-discharge port 48.

The second gas-discharge port 48 is a filter discharge port that discharges the gas from which the ozone is removed by the filter 49 to the outside of the housing of the image forming apparatus 1. As mentioned above, the ozone is known to have a virus sterilizing effect. However, even if the ozone discharged from the image forming apparatus 1 has a concentration that does not affect a human body, the odor or the like may be unpleasant to the human body. Unless the ozone discharge condition such as the absence of a person is satisfied, the controller 10 performs controlling so that the gas containing the ozone is discharged from the second gas-discharge port 48 through the filter 49.

It is noted that a gate G may be provided to the branch portion between the first ventilation path 43 and the second ventilation path 44. The gate G blocks the flow of gas from the duct 42 to the first ventilation path 43 or the flow of gas from the duct 42 to the second ventilation path 44. For example, if the ozone is discharged from the first gas-discharge port 46, the gate G blocks the movement of gas from the duct 42 to the second ventilation path 44. If the ozone is not discharged, the gate G blocks the ventilation from the duct 42 to the first ventilation path 43.

Next, a second configuration example of the ventilation mechanism in the image forming apparatus according to the embodiment will be described.

Figure 5:
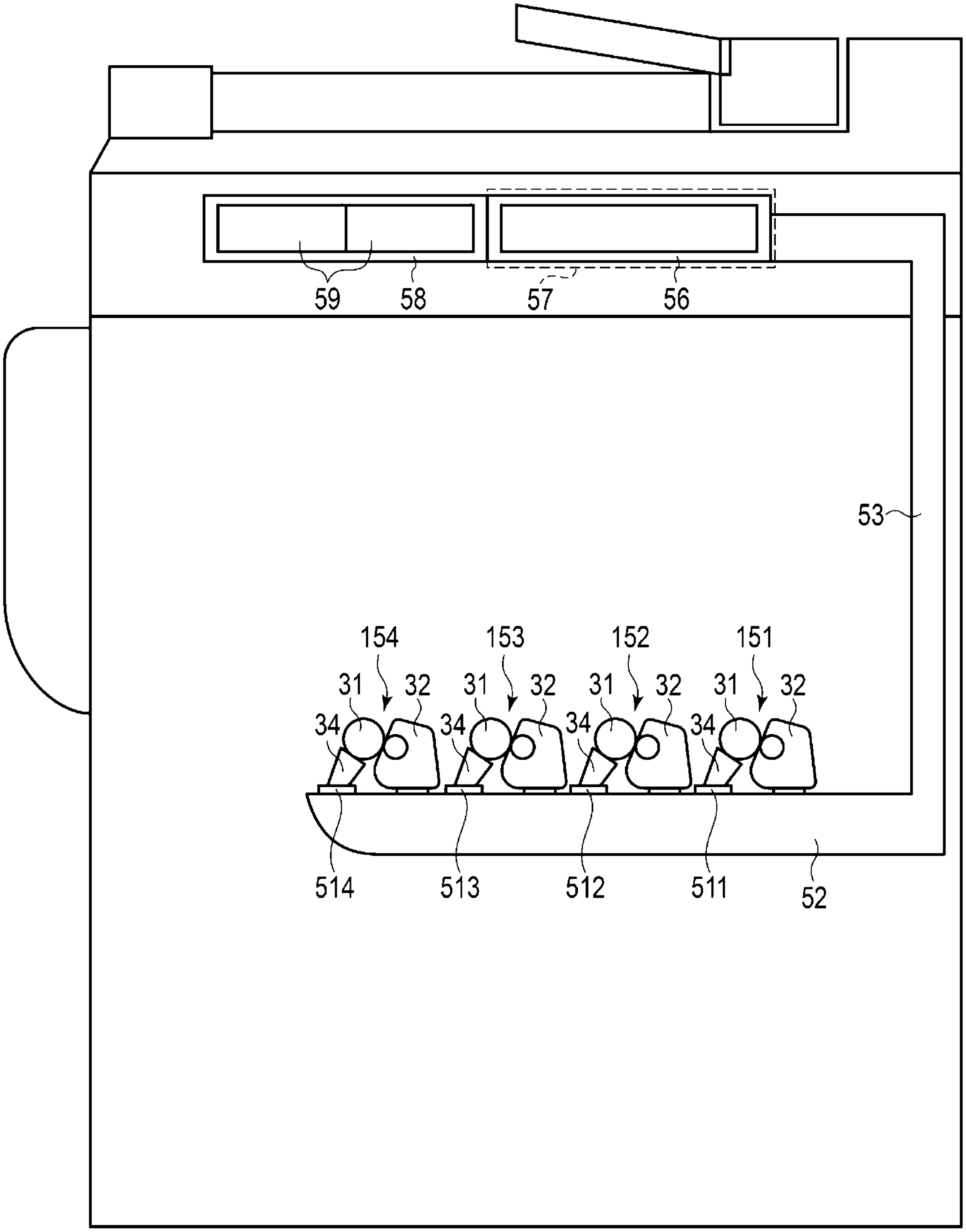
FIG. 5 is a diagram illustrating a ventilation mechanism of a second configuration example.

FIG. 5 is a diagram illustrating a ventilation mechanism 50 of the second configuration example in the image forming apparatus 1 according to the embodiment.

FIG. 5 is a diagram schematically illustrating a configuration example in which the inside of the image forming apparatus 1 including the ventilation mechanism 50 of the second configuration example is viewed from the back side.

As illustrated in FIG. 5, the ventilation mechanism 50 includes a fan 51, a duct 52, a ventilation path 53, a first gas-discharge port (ozone discharge port) 56, a shutter 57, a second gas-discharge port (filter discharge port) 58, and a filter 59.

The fans 51 (511, 512, 513, and 514) are provided corresponding to the chargers 34 of the image forming stations 151 to 154, respectively. The fan 511 sends the gas containing the ozone generated in the charger 34 of the image forming station 151 to the duct 52. The fan 512 sends the gas containing the ozone generated in the charger 34 of the image forming station 152 to the duct 52. The fan 513 sends the gas containing the ozone generated in the charger 34 of the image forming station 153 to the duct 52. The fan 514 sends the gas containing the ozone generated in the charger 34 of the image forming station 154 to the duct 52.

The duct 52 takes the gas containing the ozone generated in the chargers 34 of the image forming stations 151 to 154 via the fans 511 to 514. The duct 52 is connected to the ventilation path 53 extending upward.

The first gas-discharge port 56 and the second gas-discharge port 58 are connected to the tip of the ventilation path 53 extending upward from the connection portion with the duct 52. The first gas-discharge port 56 and the second gas-discharge port 58 are discharge ports for discharging the gas passing through the ventilation path 53 to the outside of the housing of the image forming apparatus 1. The first gas-discharge port 56 and the second gas-discharge port 58 are arranged side by side.

The filter 59 that adsorbs the ozone is provided to the second gas-discharge port 58. The filter 59 removes the ozone from the gas discharged from the second gas-discharge port 58. Since the first gas-discharge port 56 is not provided with a filter or the like, the gas containing the ozone flowing from the charger 34 through the ventilation path 53 is discharged.

The shutter 57 slides so as to shut off any one of the first gas-discharge port 56 and the second gas-discharge port 58.

Figure 6:
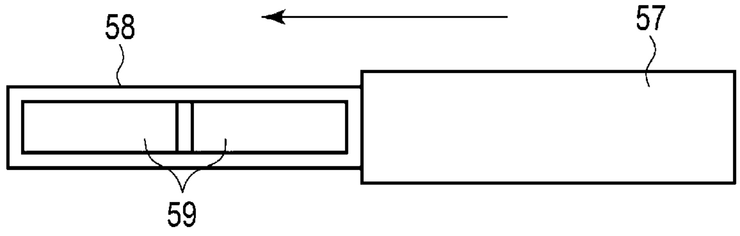
FIG. 6 is a diagram illustrating a state where the ventilation mechanism closes a first gas-discharge port with a shutter.
Figure 7:
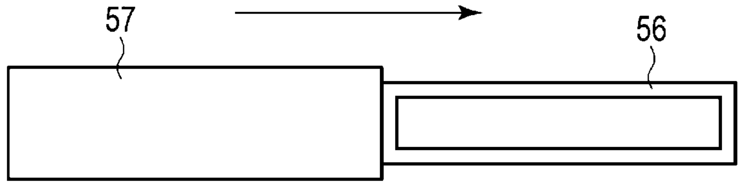
FIG. 7 is a diagram illustrating a state where the ventilation mechanism closes a second gas-discharge port with the shutter.

FIG. 6 illustrates a state where the shutter 57 closes the first gas-discharge port 56 in the ventilation mechanism 50 of the second configuration example. FIG. 7 illustrates a state where the shutter 57 closes the second gas-discharge port 58 in the ventilation mechanism 50 of the second configuration example.

As illustrated in FIG. 6, if the shutter 57 closes the first gas-discharge port 56, the second gas-discharge port 58 is opened. If the first gas-discharge port 56 is closed and the second gas-discharge port 58 is opened, the gas in the ventilation path 53 is discharged from the second gas-discharge port 58. If the shutter 57 closes the first gas-discharge port 56, the gas containing the ozone generated by the charger 34 is discharged from the second gas-discharge port 58 after the ozone is removed by the filter 59.

As illustrated in FIG. 7, if the shutter 57 closes the second gas-discharge port 58, the first gas-discharge port 56 is opened. If the first gas-discharge port 56 is opened and the second gas-discharge port 58 is closed, the gas in the ventilation path 53 is discharged from the first gas-discharge port 56. If the shutter 57 closes the second gas-discharge port 58, the gas containing the ozone generated in the charger 34 is discharged from the first gas-discharge port 56 without removing the ozone.

Next, the operations of the image forming apparatus 1 according to the embodiment will be described.

Figure 8:
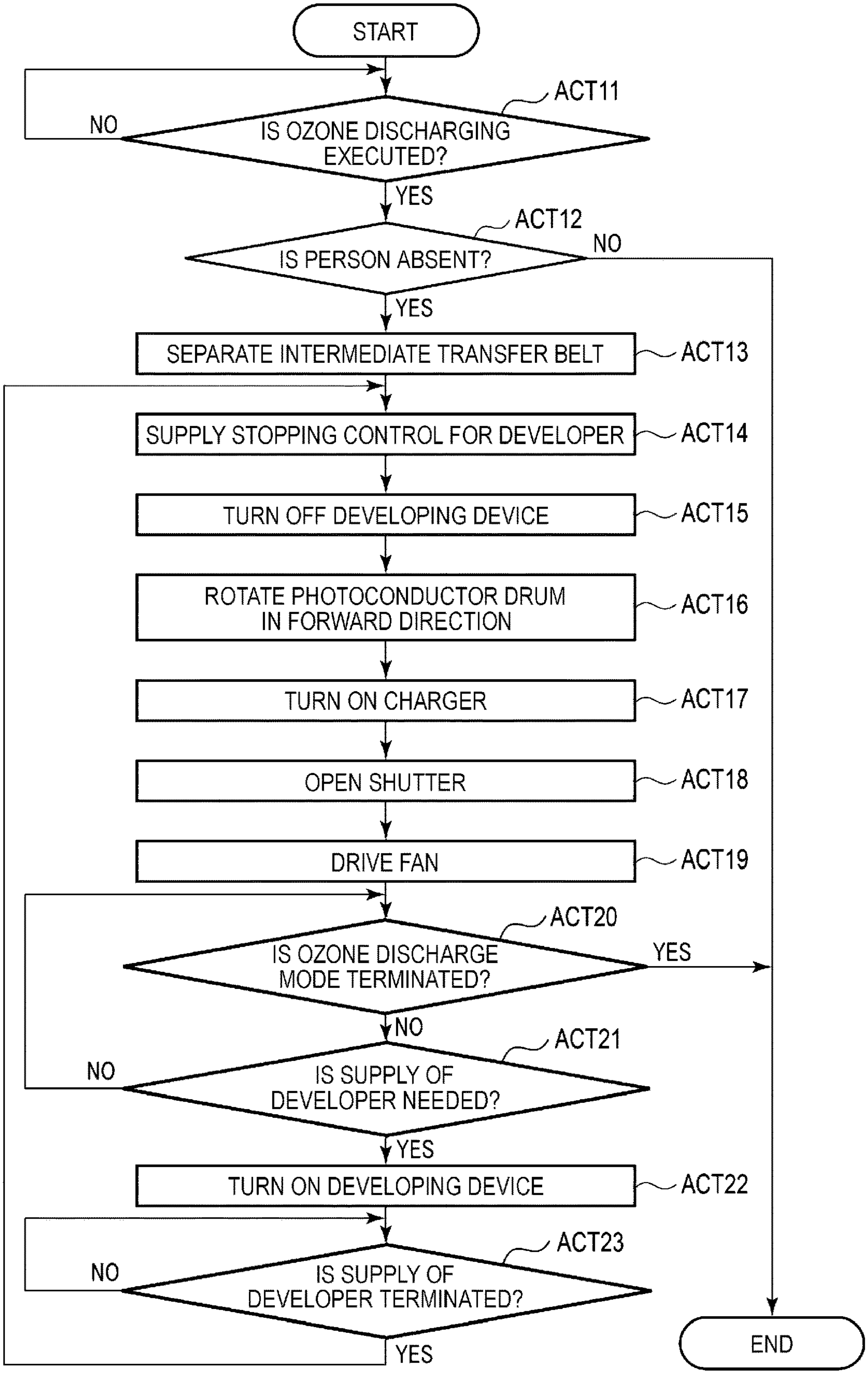
FIG. 8 is a flowchart illustrating an operation example of an ozone discharge mode.

FIG. 8 is a flowchart illustrating an operation example of the ozone discharge mode in the image forming apparatus 1 according to the embodiment. It is noted that the ozone discharge mode illustrated in FIG. 8 is an operation example of discharging the ozone in a state where the printing process (image formation) is not executed.

The controller 10 determines whether or not to execute the operation (ozone discharge mode) of discharging the ozone generated by the charger 34 to the outside of the housing (ACT11). If the preset condition is satisfied, the controller 10 determines that the operation of discharging the ozone in the ozone discharge mode is executed. For example, the controller 10 may execute the operation of discharging the ozone in a preset time zone. In addition, the controller 10 may execute the operation of discharging the ozone according to a user's instruction.

If the ozone discharging is executed (YES in ACT11), the controller 10 confirms that the person is absent (ACT12). The controller 10 confirms that a person is absent in the periphery of the image forming apparatus 1 based on the detection result of the person by the motion sensor 21. In addition, the controller 10 confirms that a person is absent because the brightness detected by the optical sensor 22 is lower than the threshold value. In addition, if the person is not detected by the motion sensor 21 and the brightness detected by the optical sensor 22 is lower than the threshold value, the controller 10 may determine that a person is absent.

If it is determined that a person is present (NO in ACT12), the controller 10 does not perform the operation in the ozone discharge mode of discharging the ozone.

If it is confirmed that a person is absent (YES in ACT12), the controller 10 determines that the operation of discharging the ozone generated in the charger 34 is executed. When executing the operation of discharging the ozone, the controller 10 performs pre-processes before discharging the ozone (ACT13 to ACT15).

As a pre-process of discharging the ozone, the controller 10 separates the intermediate transfer belt 14 from each photoconductor drum 31 by the separation mechanism (ACT13). The controller 10 separates the intermediate transfer belt 14 from the photoconductor drums 31 of the image forming stations 151 to 154 by the color separation mechanism 60 and the monochrome separation mechanism 70. By separating the intermediate transfer belt 14 and the photoconductor drum 31, deterioration of the intermediate transfer belt 14 and the photoconductor drum 31 due to the operation of discharging the ozone can be reduced.

In addition, the controller 10 stops supplying the developer from the developing device 32 to the photoconductor drum 31 as a pre-process of discharging the ozone (ACT14). The controller 10 stops the supply of the toner to the photoconductor drum 31 by rotating a developing roller that supplies the toner in the developing device 32 to the photoconductor drum 31 in the reverse direction.

Figure 9:
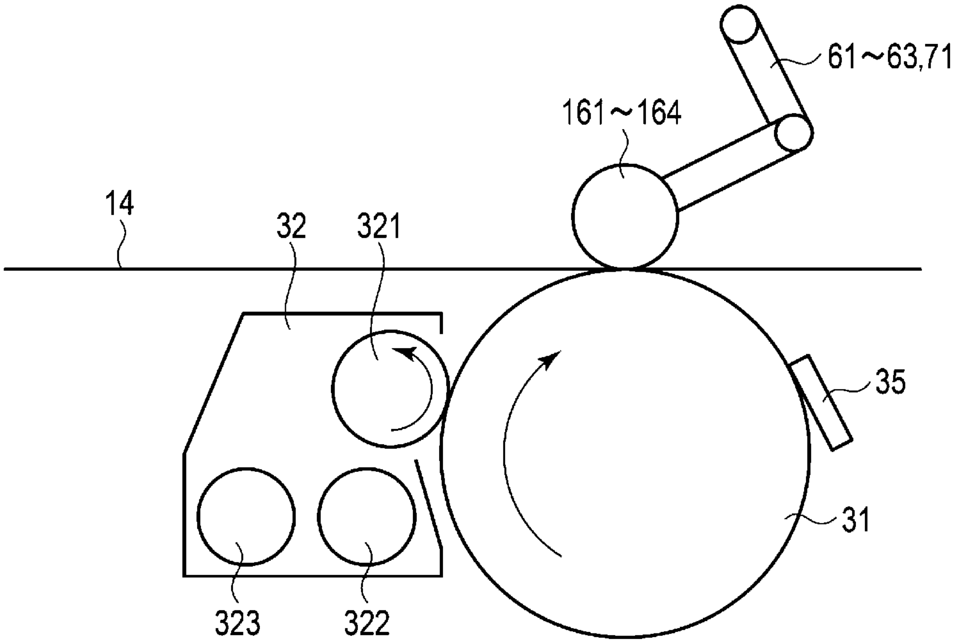
FIG. 9 is a diagram schematically illustrating a state where a photoconductor drum with which an intermediate transfer belt abuts rotates in a forward direction.
Figure 10:
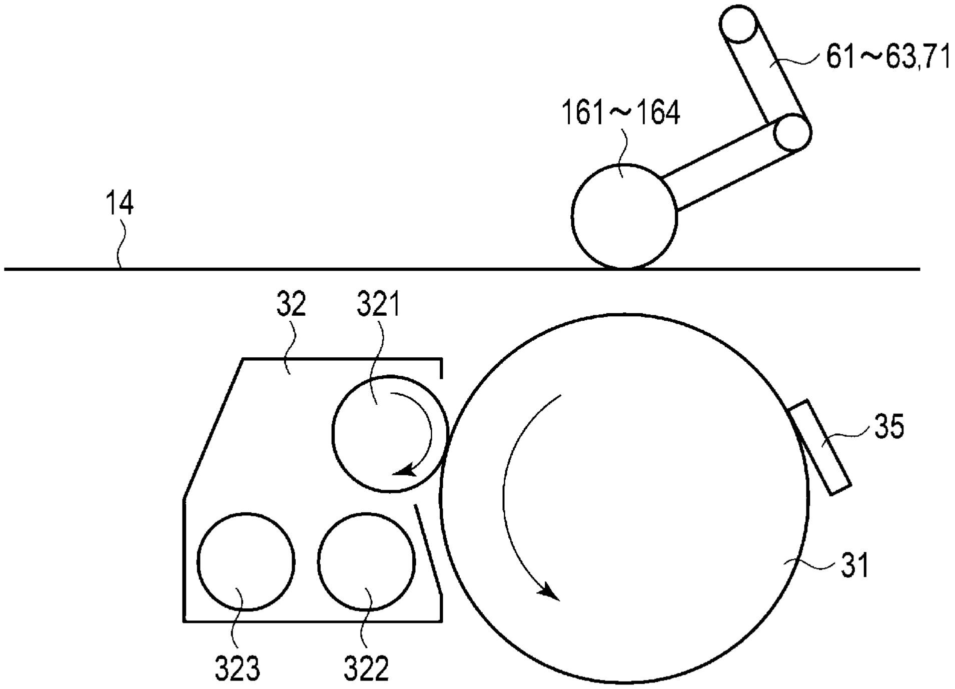
FIG. 10 is a diagram schematically illustrating a state where a photoconductor drum from which an intermediate transfer belt is separated is allowed to rotate in a reverse direction.

FIG. 9 is a diagram schematically illustrating a state where the photoconductor drum 31 with which the intermediate transfer belt 14 abuts rotates in the forward direction. FIG. 10 is a diagram schematically illustrating a state where the photoconductor drum 31 from which the intermediate transfer belt 14 is separated is allowed to rotate in the reverse direction.

As illustrated in FIG. 9, the developing device 32 includes a developing roller 321 and stirring rollers 322 and 323. If the photoconductor drum 31 rotates in the forward direction, the developing device 32 supplies the toner stirred by the stirring roller 322 to the photoconductor drum 31 by the developing roller 321.

If the charger 34 is turned on, the outer circumference surface of the photoconductor drum 31 is charged at a position facing the charger 34. The charger 34 charges the photoconductor drum 31 and generates the ozone. Even in the ozone discharge mode in which the image formation is not performed, the controller 10 rotates the photoconductor drum 31 if the charger 34 is turned on. In a case where the developing device 32 does not move if the photoconductor drum 31 rotates in the forward direction, there is a possibility that the outer circumference surface of the photoconductor drum 31 may be scraped by the developer. In addition, if the developing device 32 is continuously moved without performing the image formation, the developing device 32 continues to circulate the toner that is not consumed. Therefore, if the ozone is discharged without performing the image formation, the controller 10 executes a control (supply stopping control for the developer) for stopping the supply of the developer from the developing device 32 to the photoconductor drum 31.

As illustrated in FIG. 10, the controller 10 stops the supply of the toner from the developing device 32 to the photoconductor drum 31 by rotating the developing roller 321 in the reverse direction. The controller 10 can prevent the developer from being interposed between the photoconductor drum 31 and the developing device 32 by rotating the developing roller 321 in the reverse direction.

It is noted that the image forming apparatus may stop the supply of the toner to the photoconductor drum 31 by a control other than the reverse rotation of the developing roller 321 as a supply stopping control for the developer. For example, the image forming apparatus 1 may stop the supply of the toner to the photoconductor drum 31 by physically separating the developing device 32 and the photoconductor drum 31.

If the supply of the toner to the photoconductor drum 31 is stopped, the controller 10 turns off the developing device (ACT15). If the toner is not interposed between the photoconductor drum 31 and the developing device 32, the outer circumference surface of the photoconductor drum 31 is not scraped by the toner, and thus, it is not necessary to operate the developing device 32. If the developing device 32 is stopped, the developing device 32 can suppress deterioration without unnecessarily stirring the toner.

After turning off the developing device 32, the controller 10 rotates the photoconductor drum 31 in the forward direction (ACT16). If the photoconductor drum 31 rotates in the forward direction, the controller 10 turns on the charger 34 (ACT17). The charger 34 generates the ozone by turning on the charging under the control of the controller 10.

If the generation of the ozone is started, the controller 10 opens the first gas-discharge port 46 (or 56), which is an ozone discharge port (ACT18). The controller 10 opens the first gas-discharge port 46 (or 56) by moving the shutter 47 (or 57). If the first gas-discharge port 46 (or 56) is opened, the image forming apparatus 1 is in a state where the gas containing the ozone generated by the charger 34 can be discharged to the outside of the housing.

If the first gas-discharge port 46 (or 56) is opened, the controller 10 drives (rotates) the fans 41 and 45 (or 51) (ACT19). By driving the fans 41 and 45 (or 51), the gas containing the ozone generated in the charger 34 is sent from the charger 34 to the first gas-discharge port 46 (or 56).

In the case of the ventilation mechanism 19 of the first configuration example illustrated in FIGS. 1 and 2, the controller 10 opens the first gas-discharge port 46 by opening the shutter 47. As illustrated in FIG. 4, the controller 10 diffuses the gas discharged from the first gas-discharge port 46 upward by opening the upper portion of the shutter 47. In addition, the controller 10 may diffuse the gas discharged from the first gas-discharge port 46 over a wide range by periodically changing the direction of the shutter 47.

If the first gas-discharge port 46 is opened, the controller 10 drives the fans 41 and 45 in the ventilation mechanism 19 of the first configuration example. The fans 41 take the gas containing the ozone generated by the charger 34 into the duct 42 by driving under the control of the controller 10. The gas containing the ozone taken into the duct 42 is sent to the first gas-discharge port 46 through the ventilation path 43 by the fans 41 and the fan 45 and is discharged from the first gas-discharge port 46.

In addition, in the case of the ventilation mechanism 50 of the second configuration example illustrated in FIG. 5, the controller 10 opens the first gas-discharge port 56 and closes the second gas-discharge port 58 by using the shutter 57. For example, as illustrated in FIG. 7, the controller 10 moves the shutter 57 to a position where the second gas-discharge port 58 is closed by the shutter 57. It is noted that the ventilation mechanism 50 may include a louver that controls the wind direction of the gas discharged from the first gas-discharge port 56. The controller 10 may diffuse the gas discharged from the first gas-discharge port 56 over a wide range by controlling the direction of the louver.

If the first gas-discharge port 56 is opened, the controller 10 drives the fan 51. The fan 51 takes the gas containing the ozone generated by the charger 34 into the duct 52 by driving under the control of the controller 10. The gas containing the ozone taken into the duct 52 is discharged from the first gas-discharge port 56 through the ventilation path 53 by the fan 51. It is noted that the ventilation mechanism 50 may be provided with a fan for sending the gas containing the ozone taken into the duct 52 to the first gas-discharge port 56 in the periphery of the ventilation path 53 or the first gas-discharge port 56.

The controller 10 determines whether or not the ozone discharge mode is terminated while continuing to discharge the ozone by the operations of ACT16 to ACT19 (ACT20). For example, if the time zone for discharging the ozone is set, the controller 10 terminates the ozone discharge mode if the time zone ends.

In addition, the controller 10 may terminate the ozone discharge mode based on the detection result detected by each sensor during the operation in the ozone discharge mode. For example, the controller 10 may continuously detect a person by the motion sensor 21 during the operation in the ozone discharge mode. The controller 10 terminates the ozone discharge mode if the motion sensor 21 detects a person. In addition, the controller 10 may continuously detect the brightness by the optical sensor 22 during the operation in the ozone discharge mode. The controller 10 terminates the ozone discharge mode if the brightness detected by the optical sensor 22 becomes higher than a predetermined threshold value.

If the ozone discharge mode is continued (NO in ACT20), the controller 10 determines whether or not the supply of the developer to the photoconductor drum 31 is needed (ACT21). During the execution in the ozone discharge mode, the controller 10 periodically executes the operation of cleaning the toner supplied to the photoconductor drum 31 with the cleaner 35. If it is determined that the supply of the toner is not needed (NO in ACT21), the controller 10 returns to ACT20 and continues the operation of discharging the ozone until it is determined that the ozone discharge mode is terminated.

The image forming stations 151 to 154 include the cleaner 35 for removing the toner adhering (remaining) to the outer circumference surface of the photoconductor drum 31. If the cleaner 35 continues to clean the outer circumference surface of the photoconductor drum 31 to which the toner does not adhere for a long time, there is a possibility that deterioration may progress. That is, the deterioration can be suppressed by periodically performing an operation in which the cleaner 35 actually removes the toner adhering to the photoconductor drum 31.

If a predetermined toner supply condition is satisfied during the execution of the ozone discharge mode, the controller 10 supplies the toner to the photoconductor drum 31. The cleaner 35 removes the toner adhering to the photoconductor drum 31. The toner supply condition is stored in the memory in the controller 10. For example, the toner supply condition is an interval at which the cleaner 35 cleans the toner supplied to the photoconductor drum 31 during the execution of the ozone discharge mode.

The toner supply condition may be set according to the environment such as temperature and humidity. As a toner supply condition, as the temperature and humidity become higher, the time interval for supplying the toner to the photoconductor drum 31 is set to be shorter. That is, as the temperature and humidity become higher, the actual toner cleaning is performed more frequently, so that deterioration can be suppressed in a high temperature and high humidity environment.

If it is determined that the supply of the toner to the photoconductor drum 31 is needed (YES in ACT21), the controller 10 drives the developing device 32 (ACT22). The developing device 32 drives the developing rollers 321 and the stirring rollers 322 and 323 according to the control of the controller 10. If the developing device 32 is driven, the toner is supplied from the developing device 32 to the photoconductor drum 31 that rotates in the forward direction. The outer circumference surface of the photoconductor drum 31 to which the toner is supplied from the developing device 32 is cleaned by the cleaner 35.

The controller 10 executes the supply of the toner from the developing device 32 to the photoconductor drum 31 until a predetermined time elapses from the start of the supply of the toner (NO in ACT23). The controller 10 determines that the supply of the toner is terminated if a predetermined time is elapsed from the start of the supply of the toner (YES in ACT23). If it is determined that the supply of the toner is stopped, the controller 10 proceeds to ACT14 and executes a supply stopping control for the toner. After stopping the supply of the toner, the controller 10 executes the operations subsequent to ACT14 again.

If the controller 10 determines that the ozone discharge mode is terminated (YES in ACT20), the controller 10 stops the operation of discharging the ozone. For example, if the ozone discharge mode is terminated, the controller 10 stops the operations of each component, and the first gas-discharge port 46 or 56 is closed by the shutter 47 or 57.

According to the above-described operation example, the image forming apparatus has the ozone discharge mode as an operation mode of discharging the ozone without performing the image formation. If the ozone is discharged without performing the image formation, the image forming apparatus rotates the developing roller of the developing device in the direction opposite to the forward direction for developing the electrostatic latent image on the photoconductor drum. The image forming apparatus peels off the developer by rotating the developing roller in the reverse direction and, after that, rotates the photoconductor drum in the forward direction to turn on the charger. The image forming apparatus discharges the ozone generated by the charger from the discharge port by a ventilation mechanism.

If the ozone is discharged without performing the image formation, the image forming apparatus can rotate the photoconductor drum in a state where the developer does not abut with the outer circumference surface of the photoconductor drum. As a result, if the operation of discharging the ozone is performed without performing the image formation, the image forming apparatus can suppress the deterioration of the photoconductor drum. In addition, since the developing device does not need to be operated if the ozone is discharged without performing the image formation, the image forming apparatus can suppress the deterioration of the developer.

In addition, if the ozone is discharged without performing the image formation, the image forming apparatus rotates the photoconductor drum after separating the intermediate transfer belt and the photoconductor drum. Accordingly, if the operation of discharging the ozone is executed without performing the image formation, the image forming apparatus can suppress deterioration of the photoconductor drum and the intermediate transfer belt.

It is noted that, in the above-described operation example, the ozone discharge mode of discharging the ozone if the image forming apparatus 1 is in a state where the image formation is not performed is described. However, the image forming apparatus 1 may allow the ozone to be discharged during the execution of the image formation if a person is absent in the periphery. During the execution of the image formation, the charger 34 generates the ozone in order to charge the photoconductor drum 31. Therefore, if the fans 41 and 45 (or 51) is driven by opening the first gas-discharge port 46 (or 56) during the execution of the image formation, the ozone generated by the charger 34 is discharged from the first gas-discharge port 46 (or 56).

For example, the controller 10 confirms that a person is absent in the periphery based on the detection signal of the motion sensor 21 or the detection signal of the optical sensor 22 during the execution of the image formation. When the controller 10 confirms that a person is absent in the periphery during the execution of the image formation, the controller 10 opens the shutter 47 to open the first gas-discharge port 46 and drives the fans 41 and 45. Accordingly, when a person is absent in the periphery during the execution of the image formation, the image forming apparatus 1 provided with the ventilation mechanism 19 can discharge the ozone generated by the charger 34 from the first gas-discharge port 46.

In addition, when the controller 10 confirms that a person is absent in the periphery during the execution of the image formation, the controller 10 moves the shutter 57 to a position where the first gas-discharge port 56 is opened and drives the fan 51. Accordingly, when a person is absent in the periphery during the execution of the image formation, the image forming apparatus 1 provided with the ventilation mechanism 50 can discharge the ozone generated by the charger 34 from the first gas-discharge port 46.

In addition, the image forming apparatus 1 may diffuse the discharged ozone by cooperating with an air conditioning equipment. For example, the image forming apparatus 1 is provided with a communication interface for communicating with the controller of the air conditioning equipment. The communication interface may be a wireless communication (Bluetooth (registered trademark), WiFi (registered trademark), or the like) interface or may be a wired communication (wired LAN) interface. The controller 10 of the image forming apparatus 1 communicates with the controller of the air conditioning equipment via the communication interface.

The controller 10 of the image forming apparatus 1 controls the direction of the wind from the air conditioning equipment so as to be set to the direction of diffusing the ozone discharged from the first gas-discharge port 46 (or 56) in accordance with the timing of discharging the ozone. For example, the controller 10 of the image forming apparatus 1 instructs the air conditioning equipment of the direction of the wind based on the position of the wind out-blowing port of the air conditioning equipment and the installation position of the image forming apparatus 1. Accordingly, the image forming apparatus can allow the ozone discharged from the first gas-discharge port as the ozone discharge port to be diffused over a wide range.

In addition, the server capable of communicating with the image forming apparatus 1 may control the air conditioning equipment according to the execution situation of the ozone discharge mode in the image forming apparatus 1. For example, the server controls the direction of wind by the air conditioning equipment based on the position of the image forming apparatus 1 that executes the ozone discharge mode and the position of the wind out-blowing port of the air conditioning equipment. Accordingly, the server can allow the ozone discharged from the first gas-discharge port of the image forming apparatus to be diffused over a wide range.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a photoconductor;

a charger that charges the photoconductor;

a ventilation mechanism that guides ozone generated by the charger to a first discharge port or a second discharge port;

an exposure device that forms an electrostatic latent image on the photoconductor charged by the charger;

a developing device that supplies a developer comprising toner for developing the electrostatic latent image on the photoconductor;

a transfer device that transfers a toner image from the photoconductor to a medium;

a controller that allows the ventilation mechanism to discharge the ozone generated in the charger from the first discharge port after stopping supply of the developer from the developing device to the photoconductor in an operation mode, in a mode other than the operation mode, allows the ventilation mechanism to discharge the ozone generated in the charger from the second discharge port; and a shutter that prevents the ozone generated by the charger from being discharged from the first discharge port or the second discharge port, wherein, in the operation mode in which the ozone is discharged, the controller stops the supply of the developer from the developing device to the photoconductor and, thereafter, allows the ventilation mechanism to discharge the ozone generated by the charger from the first discharge port or the second discharge port by opening the shutter, the image forming apparatus further comprising a motion sensor that detects a person being present in a periphery of the image forming apparatus, wherein the controller closes the shutter when the motion sensor detects the person being present in the periphery of the image forming apparatus.

2. The image forming apparatus according to claim 1, wherein the developing device comprises a developing roller that rotates in a predetermined direction to supply the developer to the photoconductor, and the controller allows the developing roller to rotate in a second direction opposite to a first direction in which the toner is supplied to the photoconductor to stop the supply of the developer from the developing device to the photoconductor and, thereafter, allows the ventilation mechanism to discharge the ozone generated by the charger from the first discharge port or the second discharge port.

3. The image forming apparatus according to claim 1, further comprising a separation mechanism that separates the photoconductor and the medium, wherein the controller further allows the separation mechanism to separate the photoconductor and the medium and, thereafter, allows the ventilation mechanism to discharge the ozone generated by the charger from the first discharge port or the second discharge port.

4. The image forming apparatus according to claim 1, wherein the second discharge port is a filter discharge port provided with a filter that adsorbs the ozone.

5. The image forming apparatus according to claim 4, further comprising:

the first discharge port, the first discharge port and the filter discharge port are connected to each other by a ventilation path, when the controller closed the first discharge port by the shutter, the ozone generated by the charger is discharged from the filter discharge port.

6. The image forming apparatus according to claim 1, further comprising an optical sensor that detects brightness, wherein the controller closes the shutter when the brightness detected by the optical sensor is higher than a predetermined threshold value.

7. The image forming apparatus according to claim 1, wherein the shutter is a louver that changes a wind direction of a gas comprising the ozone discharged from the first discharge port or the second discharge port upward.

8. The image forming apparatus according to claim 1, further comprising a fan that sends a gas from the first discharge port or the second discharge port to an outside of a housing of the image forming apparatus.

9. A method of processing ozone in an image forming apparatus, comprising:

charging a photoconductor thereby generating ozone;

guiding ozone generated to a first discharge port or a second discharge port through a ventilation mechanism;

forming an electrostatic latent image on the photoconductor charged;

supplying a developer comprising toner for developing the electrostatic latent image on the photoconductor;

transferring a toner image from the photoconductor to a medium;

allowing the ventilation mechanism to discharge the ozone generated from the first discharge port after stopping the supplying of the developer to the photoconductor in an operation mode, in a mode other than the operation mode, allowing the ventilation mechanism to discharge the ozone generated during the charging from the second discharge port;

preventing the ozone generated from being discharged from the first discharge port or the second discharge port using a shutter; and in the operation mode in which the ozone is discharged, stopping the supply of the developer to the photoconductor and, thereafter, allowing the ventilation mechanism to discharge the ozone generated from the first discharge port or the second discharge port by opening the shutter, the method further comprising:

detecting a person being present in a periphery of the image forming apparatus; and closing the shutter when detecting the person being present in the periphery of the image forming apparatus.

10. The method of processing ozone according to claim 9, further comprising:

rotating a developing roller that in a predetermined direction to supply the developer to the photoconductor; and allowing the developing roller to rotate in a second direction opposite to a first direction in which the toner is supplied to the photoconductor to stop the supply of the developer to the photoconductor and, thereafter, allowing the ventilation mechanism to discharge the ozone generated from the first discharge port or the second discharge port.

11. The method of processing ozone according to claim 9, further comprising:

separating the photoconductor and the medium; and thereafter, allowing the ventilation mechanism to discharge the ozone generated from the first discharge port or the second discharge port.

12. The method of processing ozone according to claim 9, further comprising:

in the operation mode in which the ozone is not discharged, allowing the shutter to close the first discharge port and the second discharge port has a filter to adsorb the ozone generated during the charging.

13. The method of processing ozone according to claim 12, further comprising:

preventing the ozone generated during the charging from being discharged from the first discharge port using the shutter, the first discharge port and the second discharge port are connected to each other by a ventilation path, when the controller closes the first discharge port by the shutter, discharging the ozone generated during the charging from the second discharge port.

14. The method of processing ozone according to claim 9, further comprising:

detecting a brightness; and closing the shutter when the brightness detected is higher than a predetermined threshold value.

15. The method of processing ozone according to claim 9, wherein the shutter is a louver that changes a wind direction of a gas comprising the ozone discharged from the first discharge port upward.

16. The method of processing ozone according to claim 9, further comprising:

sending a gas from the first discharge port or the second discharge port to an outside of a housing of the image forming apparatus using a fan.

* * * * *